United States Patent [19]
Konishi

[11] Patent Number: 5,189,541
[45] Date of Patent: * Feb. 23, 1993

[54] METHOD AND APPARATUS FOR CONNECTING BRANCH NETWORKS WITH A TRUNK NETWORK IN OPTICAL TRANSMISSION SYSTEM

[75] Inventor: Kuniyoshi Konishi, Hachioji, Japan

[73] Assignee: Kabushiki Kaisha Toshiba, Kawasaki, Japan

[ * ] Notice: The portion of the term of this patent subsequent to Oct. 22, 2008 has been disclaimed.

[21] Appl. No.: 743,913

[22] Filed: Aug. 12, 1991

Related U.S. Application Data

[63] Continuation of Ser. No. 470,416, Jan. 29, 1990, Pat. No. 5,060,224.

[30] Foreign Application Priority Data

Nov. 30, 1987 [JP] Japan ................... 62-302686

[51] Int. Cl.$^5$ ................... H04B 10/20; H04J 14/00
[52] U.S. Cl. ................... 359/118; 359/110; 370/85.12
[58] Field of Search ............ 359/110, 118, 119, 120, 359/121, 173, 179; 385/24; 370/85.12, 85.14, 85.15; 340/825.05

[56] References Cited

U.S. PATENT DOCUMENTS 5,060,224  10/1991  Konishi ................... 359/119

FOREIGN PATENT DOCUMENTS 0260835  10/1990  Japan ................... 359/118

Primary Examiner—Edward L. Coles, Sr.
Assistant Examiner—Kinfe-Michael Negash
Attorney, Agent, or Firm—Oblon, Spivak, McClelland, Maier & Neustadt

[57] ABSTRACT

In an optical transmission system including a trunk LAN having duplex optical transmission lines, and branch LANs connected with the trunk LAN through nodes, an optical signal on the optical transmission line of the trunk LAN is input to a node including an optical switch, an optical transmitting and receiving circuit, a serial-parallel converter, an internal bus, and a LAN interface. The optical signal input to the node is converted to an electric signal (serial data) by the optical transmitting and receiving circuit through the optical switch, and is converted to parallel data by the serial-parallel converter. Thereafter, the parallel data is output onto the internal bus. The LAN interface performs an operation for outputting the parallel data onto the internal bus to the branch LANs. Data on the branch LAN is output to the optical transmission line by the operation opposite to that described above. The node can include a signal optical transmitting and receiving circuit. A self return mode is set by the LAN interface, so that the presence/absence of malfunction of the node can be self-checked.

8 Claims, 6 Drawing Sheets

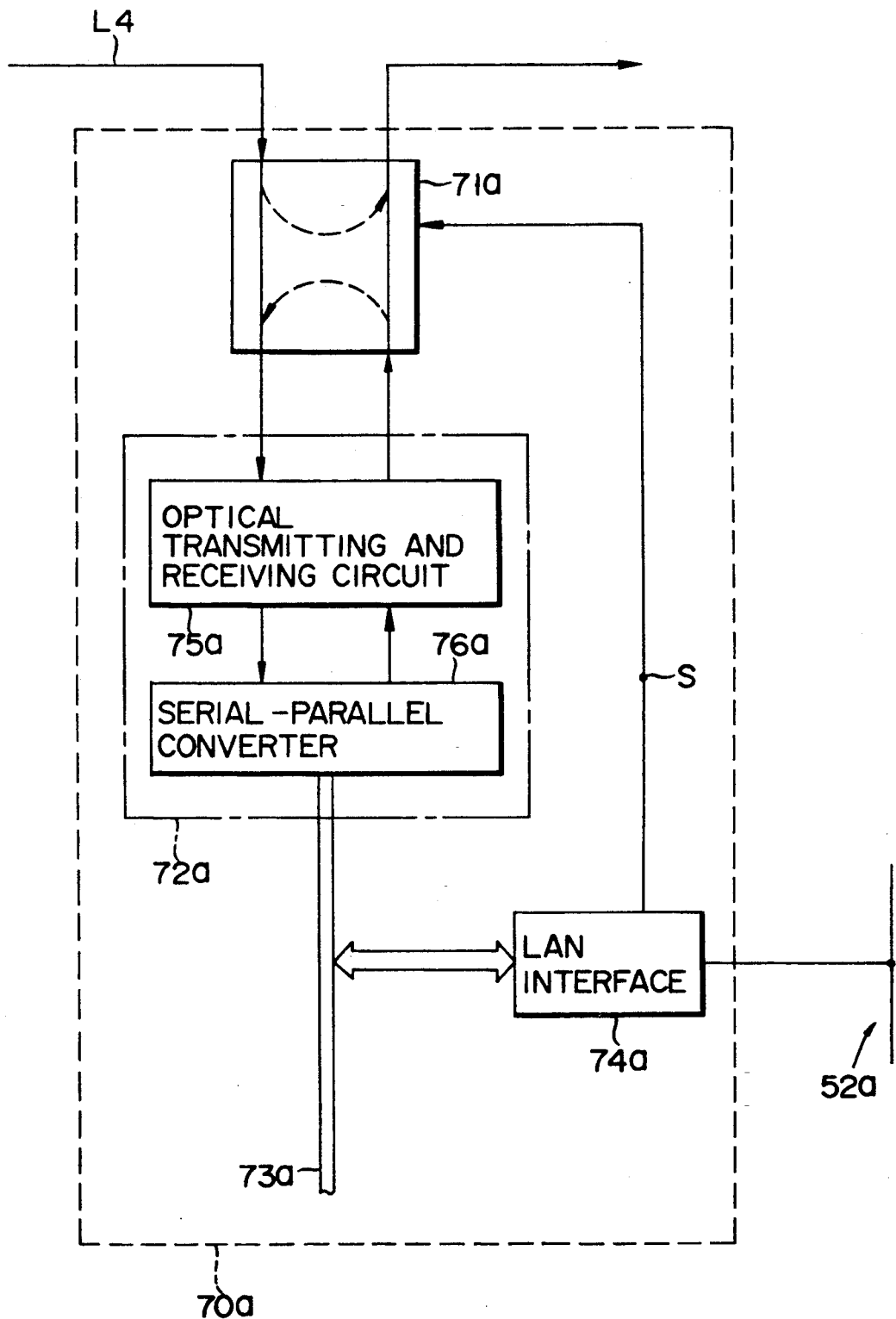
F I G. 4

METHOD AND APPARATUS FOR CONNECTING BRANCH NETWORKS WITH A TRUNK NETWORK IN OPTICAL TRANSMISSION SYSTEM

This is a continuation of application Ser. No. 07/470,416, filed on Jan. 29, 1990, now U.S. Pat. No. 5,0060,224.

BACKGROUND OF THE INVENTION

1. Field of the Invention

The present invention relates to a method and apparatus for connecting branch networks with a trunk network having duplex optical transmission lines in an optical transmission system.

2. Description of the Related Art

Recently, a large-scale local area network (LAN) has been developed. As shown in FIG. 1, ring type LAN 10 having duplex optical transmission lines L1 and L2 is often used as a trunk network. Bus type LANs 30a, 30b, 30c, and 30d connected with ring type LAN 10 through nodes 20a, 20b, and 20c having a loop back (U-link) function are often used as branch networks. Note that nodes 20a, 20b, and 20c have transmitting and receiving units 21a, 21b, and 21c, and LAN interfaces 22b, 23b, 24a, and 24b for performing data transfer between ring type LAN 10 and bus type LANs 30a, 30b, 30c, and 30d. More specifically, as shown in FIG. 2, transmitting and receiving unit 21a of node 20a has optical transmitting and receiving circuits 10a and 10b, switching circuit 11, serial-parallel converter 12, and network controller 13. Optical signals on optical transmission lines L1 and L2 are converted to electric signals by optical transmitting and receiving circuits 10a and 10b, and are input to serial-parallel converter 12 through switching circuit 11 controlled by network controller 13. Serial-parallel converter 12 converts the input electric signals into parallel data and outputs the parallel data onto internal bus 14.

In this arrangement, when optical transmission line L1 is disconnected, switching circuit 11 is switched by network controller 13, and only the electric signal from optical transmitting and receiving circuit 10a is input to serial-parallel converter 12 through switching circuit 11.

A ring type LAN is not used as a branch network since two sets of expensive optical transmitting and receiving circuits are necessary at the nodes of the ring type LAN, as shown in FIG. 2. In place of adding new nodes, repeaters 32a to 32d in LAN 32 are arranged through LAN interface 23a, thereby extending transmission lines to desired locations. However, an extended distance is limited by a data transmission delay time caused by extension of the transmission lines.

Star type LAN 33 is connected with ring type LAN 10 through LAN interface 22a. However, optical star coupler 33a or the like used in star type LAN 33 is expensive, and an extended distance is also limited by a data transmission delay time caused by extension of the transmission lines. Therefore, star type LAN 33 is not used except for a special application.

As described above, a strong demand has arisen for an inexpensive apparatus which can facilitate connection of bus type branch networks with a ring type trunk network.

SUMMARY OF THE INVENTION

It is an object of the present invention to provide a method and apparatus for connecting branch networks with a trunk network having duplex optical transmission lines in an optical transmission system.

According to one aspect of the present invention, there is provided an apparatus for connecting branch networks with a trunk network including a plurality of nodes having a loop back function and an optical transmission line, the apparatus comprising: first converting means for converting a first optical signal on the trunk network into a first electrical signal; and second converting means for converting first serial data representing the first electric signal converted by the first converting means into first parallel data; interface means for receiving the first parallel data converted by the second converting means through an internal bus and transferring the received first parallel data to the branch network.

According to another aspect of the present invention, there is provided an apparatus for connecting branch networks with a trunk network including a plurality of nodes having a loop back function and an optical transmission line, the apparatus comprising: switch means connected to the trunk network for switching a data flow between the trunk network and the branch network; first converting means for converting a first optical signal on the trunk network obtained by a switching of the switch means into a first electric signal; second converting means for converting first serial data representing the first electric signal converted by the first converting means into first parallel data; interface means for receiving the first parallel data converted by the second converting means through an internal bus and transferring the received first parallel data to the branch network.

BRIEF DESCRIPTION OF THE DRAWINGS

FIG. 4 is a block diagram showing an arrangement of a node according to a first embodiment of the present invention;

DETAILED DESCRIPTION OF THE PREFERRED EMBODIMENT

An embodiment of the present invention will now be described with reference to the accompanying drawings.

Figure 3:
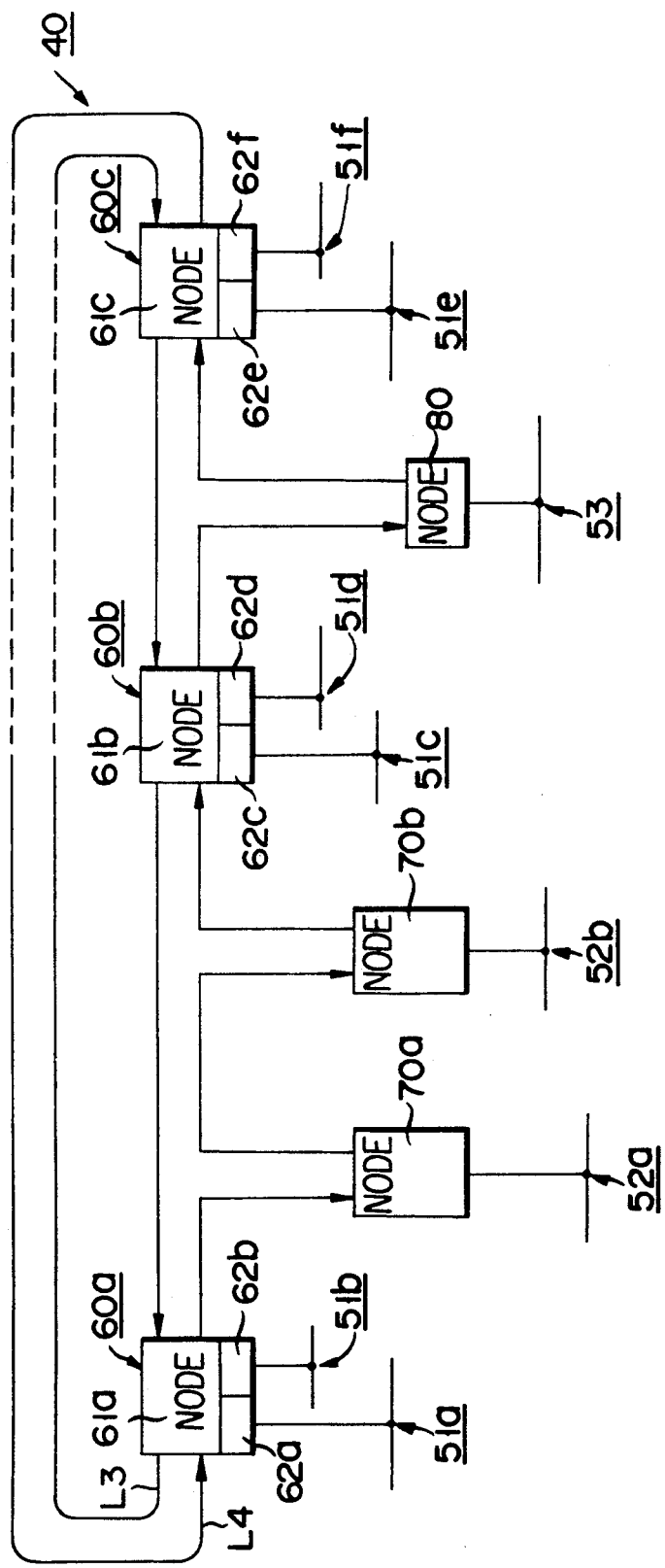
FIG. 3 is a block diagram showing an optical transmission system including nodes according to an embodiment of the present invention.

In FIG. 3, bus type LANs 51a to 51f arranged as branch LANs are connected with ring type LAN 40 arranged as a trunk LAN having duplex optical transmission lines L3 and L4 through nodes 60a to 60c having a loop back function. Nodes 60a to 60c have transmitting and receiving units 61a to 61c, and LAN interfaces 62a to 62f for performing data transfer between ring type LAN 40 and bus type LANs 51a to 51f. Bus type LANs 52a and 52b are connected with ring type LAN 40 through nodes 70a and 70b. Bus type LAN 53 is connected with ring type LAN 40 through node 80.

Nodes 70a and 70b are used when two or more nodes are arranged between two nodes having a loop back function, and are connected with one of duplex optical transmission lines L3 and L4 (L4 in FIG. 3). As shown in FIG. 4, node 70a has optical switch 71a having a function of bypassing optical transmission line L4, transmitting and receiving unit 72a connected with optical switch 71a having an optical/electrical conversion function, and LAN interface connected with transmitting and receiving unit 72a through internal bus 73a having a function of performing data transfer between bus type LAN 52a and ring type LAN 40. Note that node 70b has the same arrangement as that of node 70a. LAN interface 74a controls optical switch 71a using switching control signal S.

Transmitting and receiving unit 72a has optical transmitting and receiving circuit 75a including an optical-/electrical converter (not shown) for converting an optical signal into an electric signal and an electrical-/optical converter (not shown) for converting an electric signal into an optical signal, and serial-parallel converter 76a for converting an electric signal (serial data) output from optical transmitting and receiving circuit 75a into parallel data, and converting parallel data on internal bus 73a into serial data.

Figure 1:
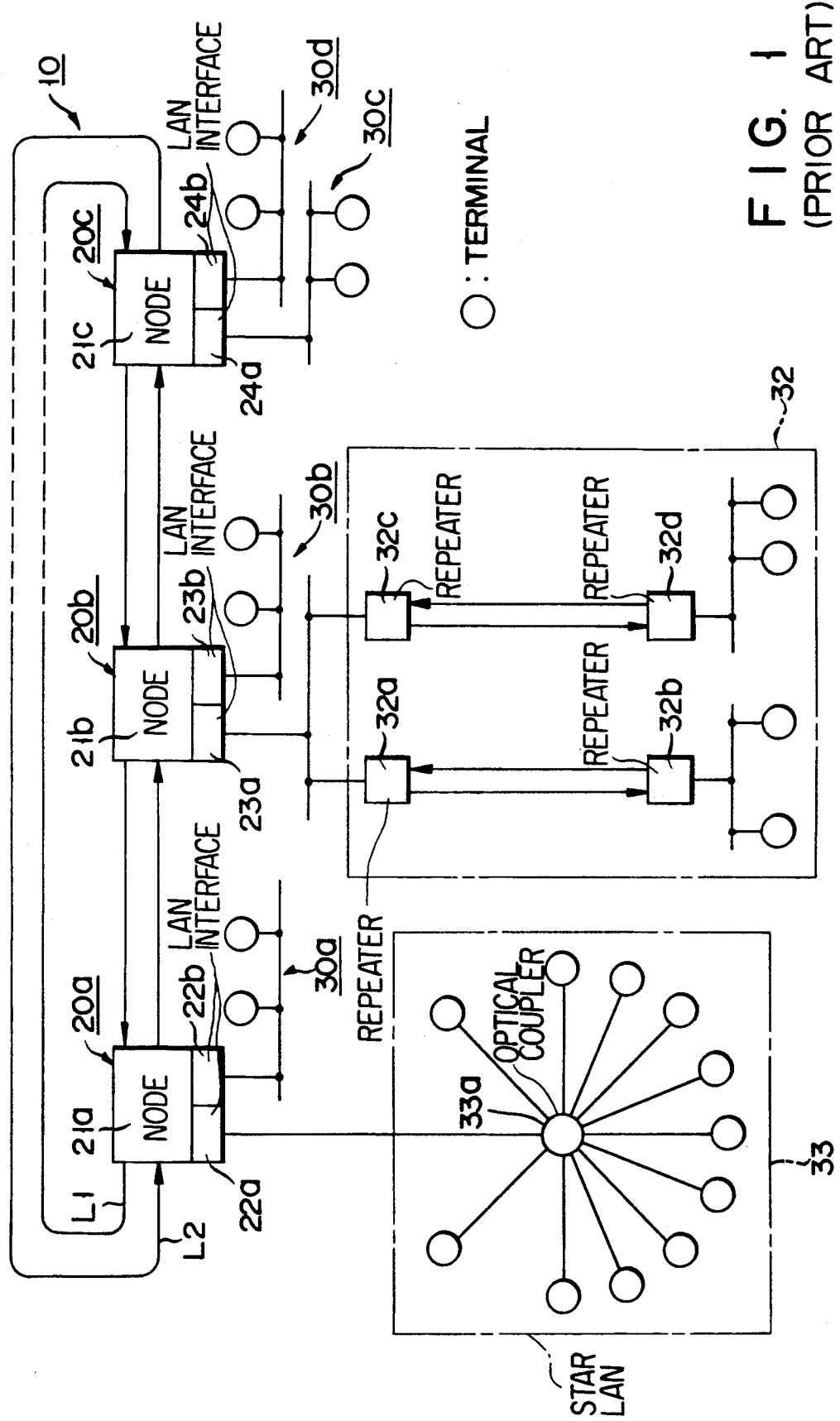
FIG. 1 is a block diagram showing an optical transmission system including conventional nodes.
Figure 2:
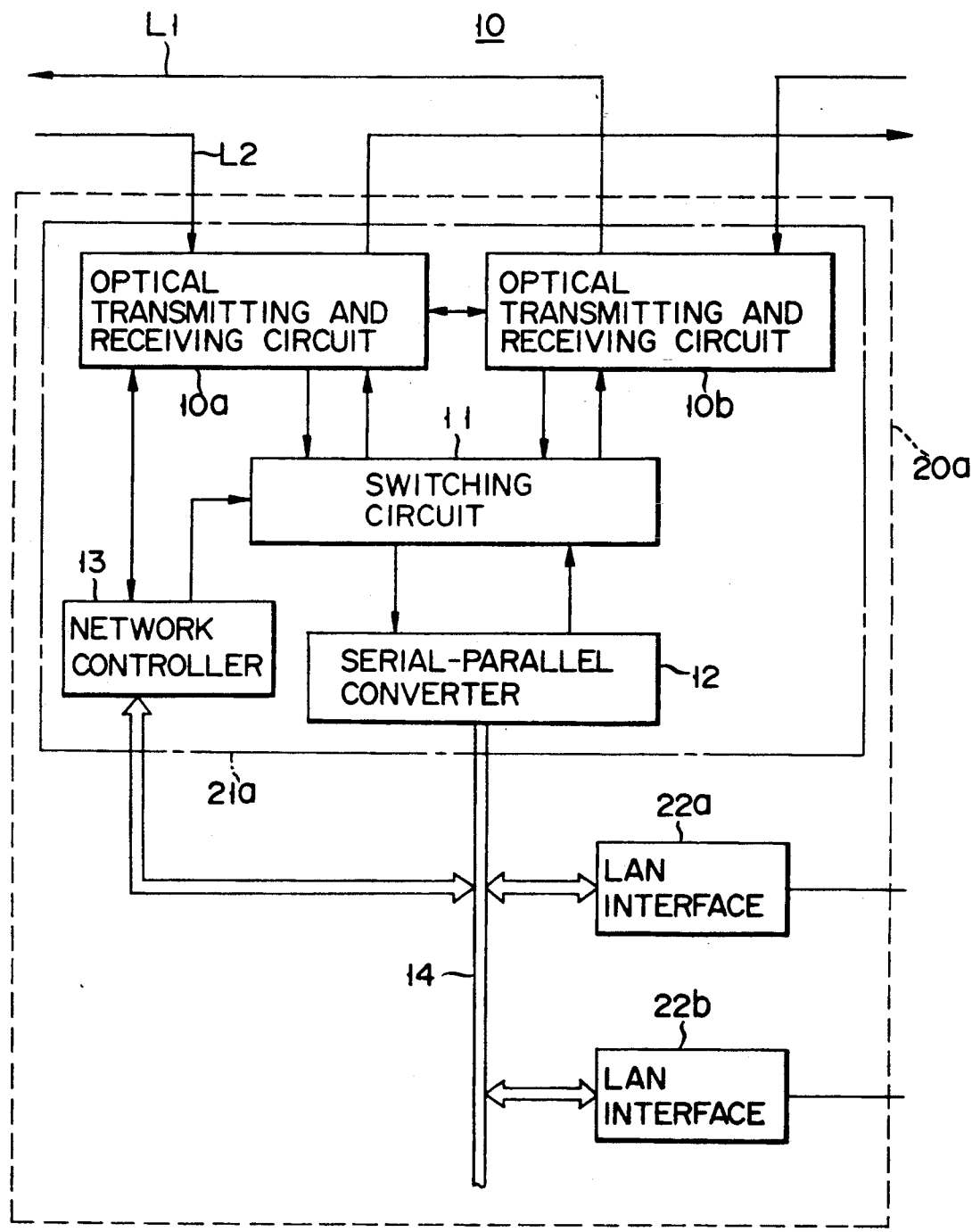
FIG. 2 is a block diagram showing an arrangement of the conventional node.

Note that nodes 60a to 60c have the same arrangement as node 20a shown in FIG. 2.

Node 80 is used when a single node is arranged between two nodes having a loop back function, and does not include optical switch 71a.

The operation of the node according to a first embodiment of the present invention will now be described.

In FIG. 4, optical switch 71a is normally set in a transmitting and receiving mode under the control of LAN interface 74a. In this transmitting and receiving mode, an optical signal on optical transmission line L4 is input to optical transmitting and receiving circuit 75a through optical switch 71a. Optical transmitting and receiving circuit 75a converts the optical signal input through optical switch 71a into an electric signal, and outputs the electric signal to serial-paaallel converter 76a. Serial-parallel converter 76a converts the electric signal (serial data) output from optical transmitting and receiving circuit 75a into parallel data, and outputs the parallel data onto internal bus 73a. When the parallel data output from serial-parallel converter 76a is data for equipment (not shown) connected with bus type LAN 52a, LAN interface 74a outputs this data to bus type LAN 52a.

LAN interface 74a monitors the transmission line of bus type LAN 52a. When data for another bus type LAN is present on this transmission line, interface 74a outputs this data to serial-parallel converter 76a through internal bus 73a. Serial-parallel converter 76a converts the data output from LAN interface 74a into serial data, and outputs the serial data to optical transmitting and receiving circuit 75a. Optical transmitting and receiving circuit 75a converts the serial data (an electric signal) output from serial-parallel converter 76a into an optical signal, and outputs the optical signal to optical switch 71a. When optical switch 71a is set in the transmitting and receiving mode, the optical signal output from optical transmitting and receiving circuit 75a is output onto optical transmission line L4 through optical switch 71a.

Figure 5:
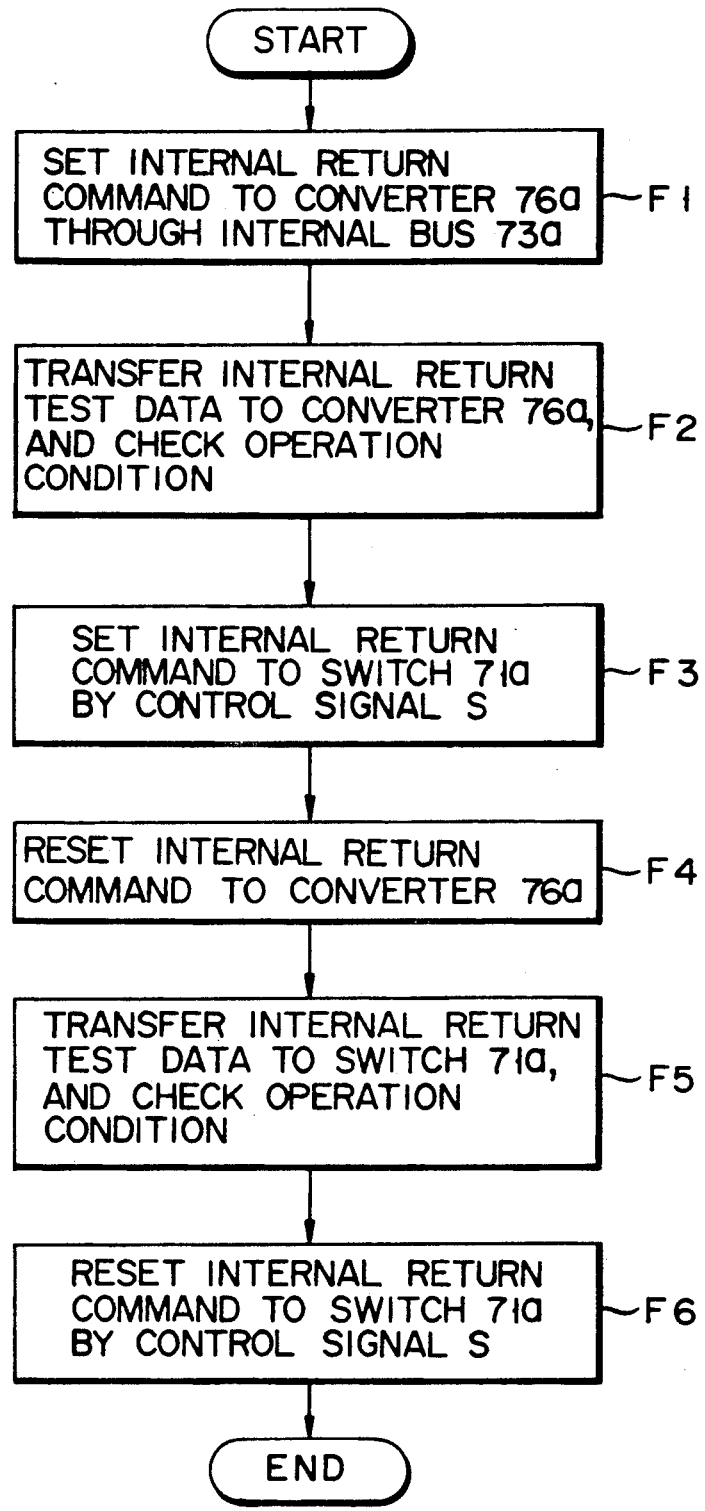
FIG. 5 is a flow chart of a self-checking operation of a LAN interface in the node of the first embodiment.

In this arrangement, when one of nodes 70a and 70b malfunctions, nodes 60a and 60b arranged at both sides of nodes 70a and 70b are set in a U-link state by the loop back function, and nodes 70a and 70b are temporarily disconnected from ring type LAN 40. Upon data transfer from bus type LAN 52a to ring type LAN 40 or data transfer for checking ring type LAN 40, for example, LAN interface 74a of node 70a, monitors a response to the transfer data, thereby detecting an abnormality. When an abnormality is detected by LAN interface 74a due to malfunction of node 70a or other causes, LAN interface 74a switches optical switch 71a from the transmitting and receiving mode to a self return mode using switching control signal S, so that optical transmission line L4 is bypassed through node 70a. Then, LAN interface 74a performs self checking operation according to a flow chart shown in FIG. 5.

More specifically, in step F1, an internal return command is set in serial-parallel converter 76a through internal bus 73a. In step F2, test data is transferred to serial-parallel converter 76a. The test data is returned at serial-parallel converter 76a, and is then input to LAN interface 74a as return data. The operation state of serial-parallel converter 76a can be checked by the return data corresponding to the test data.

In step F3, an internal return command is set in optical switch 71a by switching control signal S. More specifically, optical switch 71a is set in the self return mode. In step F4, the internal return command set in serial-parallel converter 76a in step F1 is reset. In step F5, test data output from LAN interface 74a is converted to serial data by serial-parallel converter 76a, and is converted to an optical signal by optical transmitting and receiving circuit 75a. Thereafter, the optical signal is input to optical switch 71a. The optical signal input to optical switch 71a is returned since the optical switch 71a is set in the self return mode, and is input to optical transmitting and receiving circuit 75a. The optical signal input to optical transmitting and receiving circuit 75a is converted to an electric signal (serial data), and is then converted to parallel data by serial-parallel converter 76a. Thereafter, the parallel data is input to LAN interface 74a. Thus, the operation state of optical transmitting and receiving circuit 75a can be checked based on the presence/absence of return data corresponding to test data and on the state of the return data (self-checking test). If no abnormality is detected in this self-checking test, the internal return command set in optical switch 71a by switching control signal S is reset in step F6. More specifically, optical switch 71a is switched to the transmitting and receiving mode. Thus, a normal operation can be performed.

If an abnormality is detected in the self-checking test, LAN interface 74a sets the self return mode in optical switch 71a, and maintains a bypass state.

As described above, if one of nodes 70a and 70b arranged between nodes 60a and 60b malfunctions, both the nodes are set in a bypass state, and the self-checking test is performed. If no abnormality is detected in the self-checking test, nodes 70a and 70b are connected with ring type LAN 40 again. If an abnormality is detected in the self-checking test, nodes 70a and 70b maintain a bypass state. More specifically, as a result of the self-checking test, only a node in which an abnormality is detected (to be referred to as a malfunction node hereinafter) is disconnected from ring type LAN 40.

After the malfunction node is disconnected from ring type LAN 40, the nodes with the loop back function at both sides of the malfunction node are shifted from the U-link state to the normal state. Thus, nodes excluding the malfunction node connect the bus type LANs to ring type LAN 40.

When an optical transmission line is disconnected, a node having a loop back function is disconnected.

Figure 6:
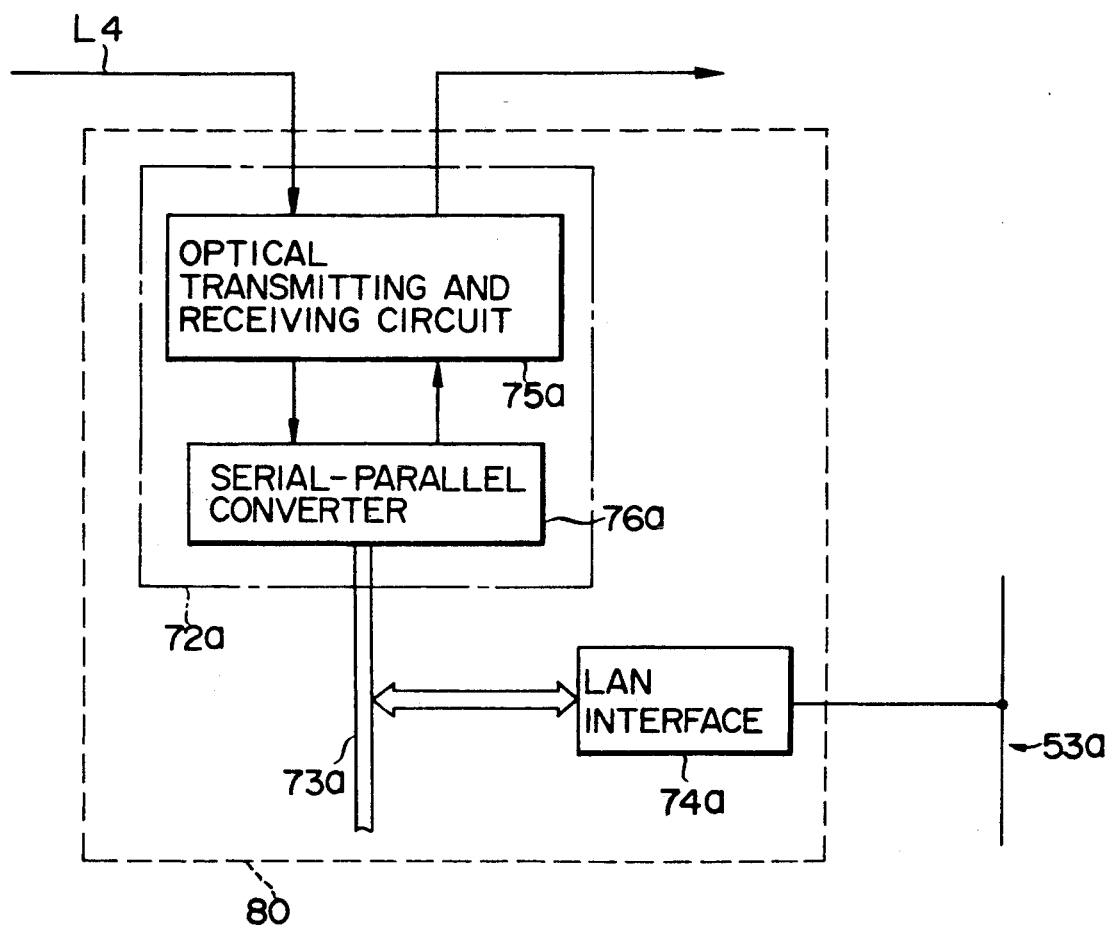
FIG. 6 is a block diagram showing an arrangement of a node according to a second embodiment of the present invention.

When node 80 arranged between two nodes 60b and 60c malfunctions, nodes 60b and 60c at both sides of node 80 are set in a U-link state, and node 80 is disconnected from ring type LAN 40. Since no node excluding node 80 is arranged between two nodes 60b and 60c, an operation for checking the presence/absence of malfunction of a node by the self-checking test and connecting a node free from malfunction to an optical transmission line can be omitted unlike in the first embodiment. As described above, when only one node is arranged between two nodes having a loop back function, optical switch 71a shown in FIG. 4 can be omitted, and a node shown in FIG. 6 can be used in place of a node shown in FIG. 4.

As described above, when the number of expensive optical transmitting and receiving circuits (two circuits are arranged in a conventional node having a loop back function) is reduced to one, a bus type branch network can be connected with a ring type trunk network. Therefore, a branch network arranged at a desired location can be connected with the trunk network without using an expensive node having a loop back function and a repeater having a limitation on an extended distance. When a node having an optical switch is used, since self checking of an optical transmitting and receiving circuit having most frequently malfunction can be performed, reliability of the network can be improved.

The specific embodiments of the present invention has been described. However, the present invention is not limited to the above embodiments, and various changes and modifications may be made within the spirit and scope of the invention.

What is claimed is:

1. An optical network system comprising:
   a trunk network having a first and second ring type optical transmission lines;
   a plurality of trunk nodes including a first trunk node connected to the first and second ring type optical transmission lines, the first trunk node having a first loop back circuit, and a second trunk node connected to the first and second ring type optical transmission lines, the second trunk node having a second loop back circuit;
   a first branch node connected to the first ring type optical transmission line, the first branch node located between the first and second trunk nodes;
   a second branch node connected to the first ring type optical transmission line, the second branch node located between the first and second trunk nodes;
   a plurality of branch networks having a first branch network connected to the first trunk node and a second branch network connected to the second trunk node;
   the first branch node including first switch means for switching a data flow between the first ring type optical transmission line and the first branch network, first conversion means for converting an optical signal from the first switch means into an electric signal and first interface means for transferring the electric signal from the first conversion means to the first branch network, the first switch means having a first mode for directly returning the optical signal received from the first ring type optical transmission line to the first ring type optical transmission line so as to disconnect the data flow between the first ring type optical transmission line and the first branch network and a second mode for transferring the optical signal received from the first ring type optical transmission line to the first conversion means so as to connect the data flow between the first ring type optical transmission line and the first branch network, the first interface means controlling the first switch means between the first mode and the second mode; and
   the second branch node including second switch means for switching a data flow between the first ring type optical transmission line and the second branch network, second conversion means for converting an optical signal from the first switch means into an electric signal and second interface means for transferring the electric signal from the second conversion means to the second branch network, the second switch means having a first mode for directly returning the optical signal received from the first ring type optical transmission line to the first ring type optical transmission line so as to disconnect the data flow between the first ring type optical transmission line and the second branch network and a second mode for transferring the optical signal received from the first ring type optical transmission line to the second conversion means so as to connect the data flow between the first ring type optical transmission line and the second branch network, the second interface means controlling the second switch means between the first mode and the second mode.

2. An optical network system according to claim 1, wherein each of the interface means controls the corresponding switch means from the second mode to the first mode when the first or second branch nodes are abnormal, checks whether the corresponding conversion means is abnormal, and controls the corresponding switch means from the first mode to the second mode if the corresponding conversion means is normal, respectively.

3. An optical network system according to claim 9, wherein each of the loop back circuit includes a loop back mode for disconnecting the first and second branch nodes from the trunk network and a non-loop back mode for connecting the first and second branch nodes to the trunk network, respectively, each of the trunk node controls the corresponding loop back circuit from the non-loop back mode to the loop back mode when the first or second branch nodes are abnormal, and controls the corresponding loop back circuit from the loop back mode to the non-loop back mode after the switch means corresponding to an abnormal branch node is set in the first mode.

4. An optical network system comprising:
   a trunk network having first and second ring type optical transmission lines;
   a plurality of trunk nodes including a first trunk node connected to the first and second ring type optical transmission lines and a second trunk node connected to the first and second ring type optical transmission lines; and
   at least one branch node connected to the first ring type optical transmission line between the first and second trunk nodes, and each of the at least one branch node also connected to a corresponding branch network, each of the at least one branch node including switch means for switching a data flow between the first ring type optical transmission line and the corresponding branch network, conversion means for converting optical signals from the at least one branch node's switch means into electrical signals and interface means for transferring the electrical signals from the at least one branch node's conversion means to the corresponding branch network, the switch means of each of the at least one branch node having a first mode for directly returning optical signals received from the first ring type optical transmission line to the first ring type optical transmission line so as to disconnect the data flow between the first ring type optical transmission line and the corresponding branch network, and a second mode for transferring optical signals received from the first ring type optical transmission line to the conversion means so as to connect the data flow between the first ring type optical transmission line and the corresponding branch network.

5. An optical network system according to claim 4, wherein each of the at least one branch node further comprises error detection means for detecting malfunctions in the at least one branch node, and controls the at least one branch node's switch means from the second mode to the first mode when the branch node is malfunctioning, and controls the at least one branch node's switch means from the first mode to the second mode when the at least one branch node is not malfunctioning.

6. An optical network system according to claim 5, wherein each of said at least one branch node further comprises self-test means for testing the at least one branch node when the at least one branch node's error detection means detects a malfunction in the at least one branch node.

7. An optical network system according to claim 6, wherein the first and second trunk nodes each have U-link means for disconnecting the at least one branch node from the first ring-type optical transmission line and connecting the first ring-type optical transmission line to the second ring-type optical transmission line.

8. An optical network system according to claim 7, wherein the U-link means of the first and second trunk nodes disconnects the at least one branch node from the first ring-type optical transmission line and connects the first ring-type optical transmission line to the second ring-type optical transmission line when the self-test means of the at least one branch node is testing the at least one branch node or when the error detection means of the at least one branch node detects a malfunction in the at least one branch node.

* * * * *